Patented Apr. 10, 1934

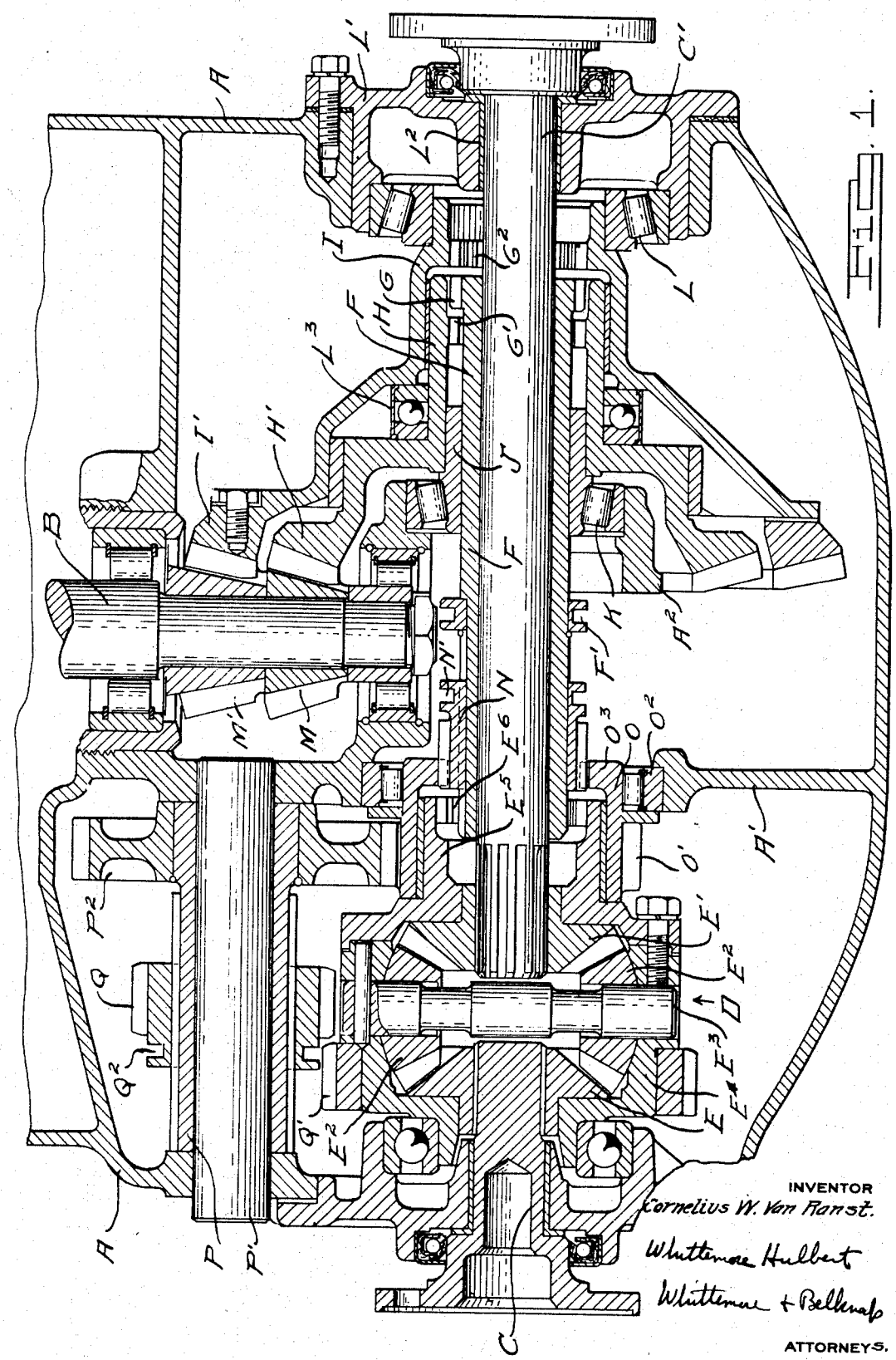

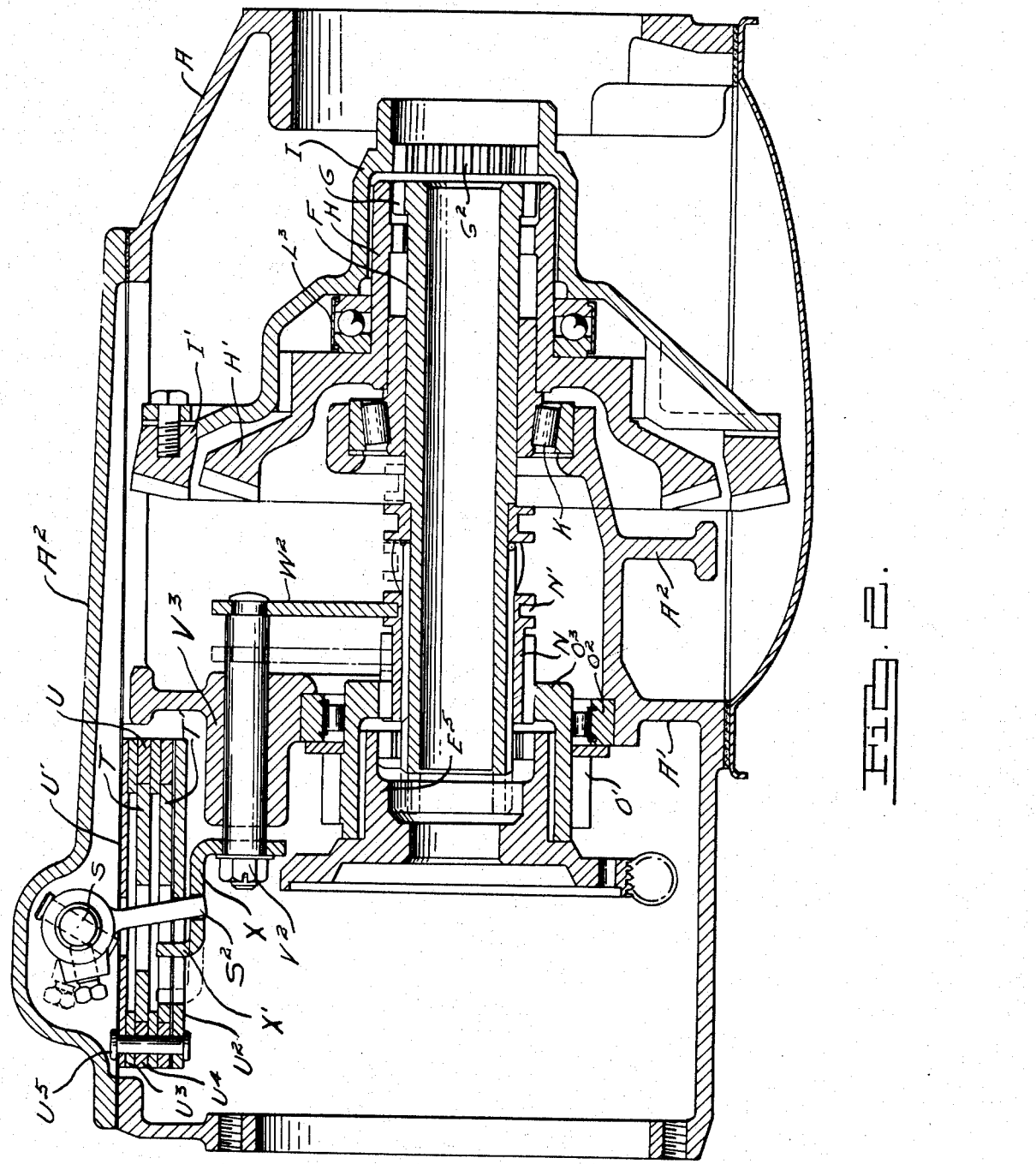

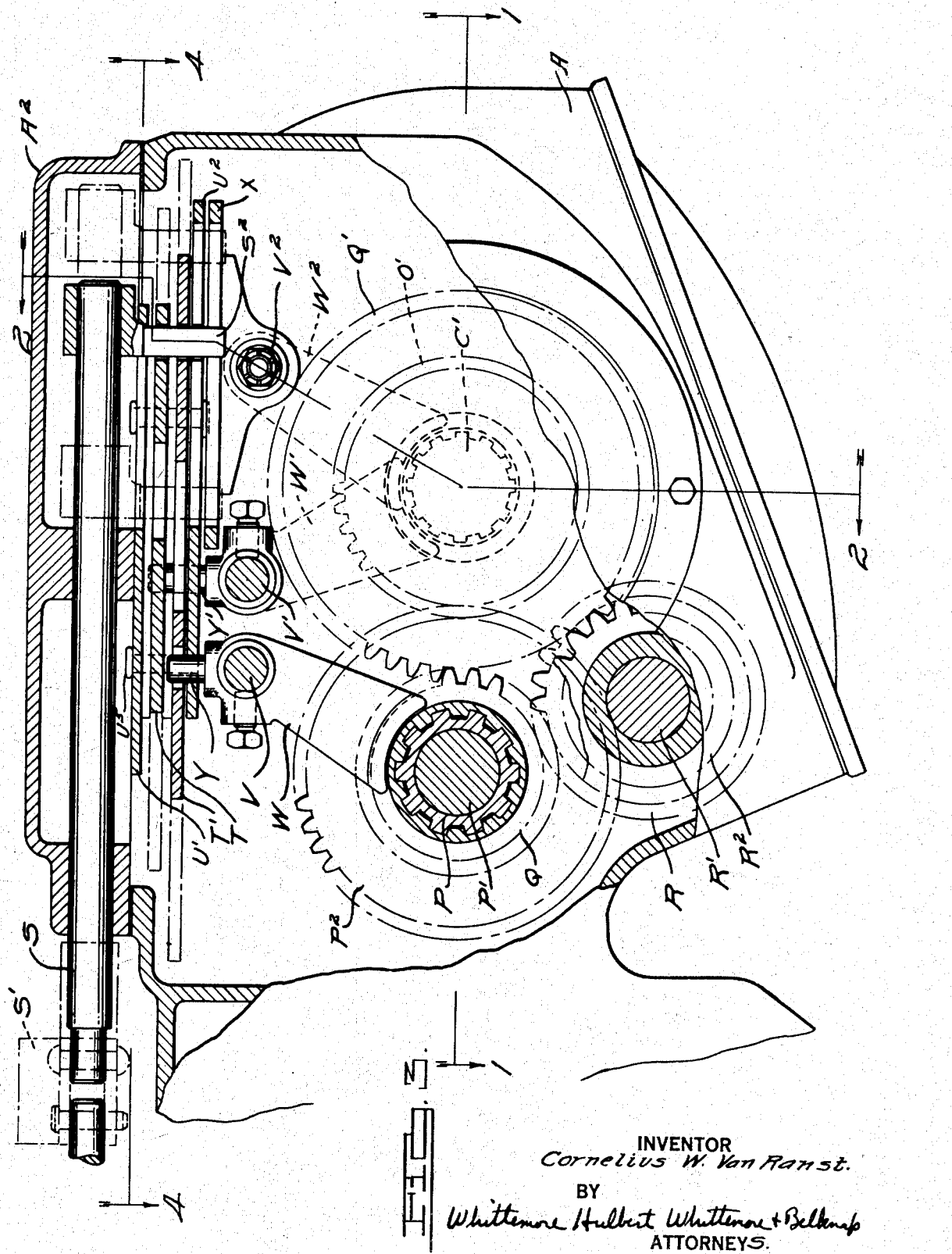

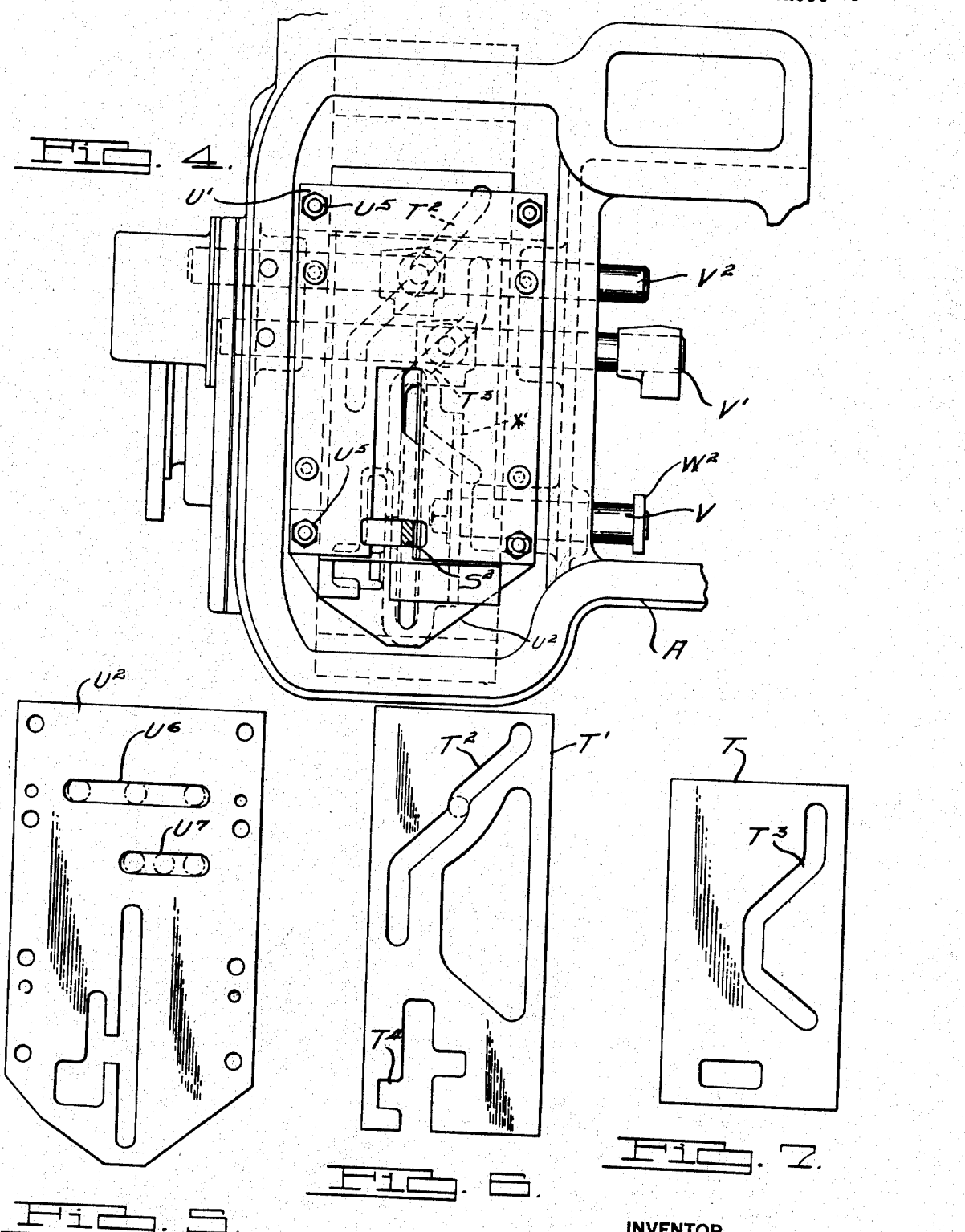

1,954,302

UNITED STATES PATENT OFFICE 1,954,302

TRANSMISSION

Cornelius W. Van Ranst, Detroit, Mich.

Application August 18, 1930, Serial No. 476,116

17 Claims. (Cl. 74—57)

The invention relates to variable speed transmission mechanisms designed for use in connection with front wheel drive mechanisms for motor vehicles. It is the object of the invention to obtain a construction which is much more compactly and conveniently arranged in relation to the power unit. It is a further object to obtain quiet operation, particularly with respect to the two highest speeds, so that either one may be used for constant driving according to road conditions. Still further it is an object to obtain a thoroughly mechanical and rugged construction and with these objects in view the invention consists in the novel construction, arrangement and combination of parts as hereinafter set forth.

In the drawings:

Figure 1 is a horizontal section through my improved transmission in the plane of the drive axle and propeller shaft;

Figure 2 is a vertical section on line 2—2 of Figure 3 with some of the parts of the mechanism omitted;

Figure 3 is a cross section partly in elevation;

Figure 4 is a plan view of the control mechanism;

Figures 5, 6 and 7 are plan views of parts of the control mechanism detached.

In the construction of variable speed transmissions for motor cars it is usual to arrange the driving and driven shafts in alignment with each other and extending longitudinally of the vehicle. It is also usual in rear wheel driven motor cars to place the transmission and clutch directly in alignment with the engine crank shaft and extending rearward from the engine casing. However, when the car is driven through the front wheels such an arrangement is not satisfactory as the total length of engine and transmission is too great to be conveniently located with respect to the forward wheels. It is therefore one of the primary objects of the present invention to obtain a construction in which the longitudinal dimension of the transmission or the depth thereof measured lengthwise of the car is greatly reduced, permitting of the arrangement of the transmission housing in alignment with the engine casing without objectionable total length. This I accomplish by an arrangement of drive, driven and counter shafts to extend transversely of the vehicle frame and by locating all of the elements of the variable speed transmission and of the differential gearing within a single housing. It is, however, equally desirable to condense the mechanism in transverse dimensions so as to provide a maximum distance between the driven shafts of the transmission and the axial spindles to accommodate the flexible shafts connecting the same. This transverse condensation I have accomplished by the concentric arrangement of certain of the elements within predetermined transverse limits and the parallel arrangement of other elements within said limits.

In detail, A is a housing which may be formed as an extension of the clutch housing and rigidly attached to the motor casing (not shown). B is the drive shaft extending centrally into the housing A from the clutch housing. C and C' are the driven shafts for the front wheels on opposite sides of the car which shafts are arranged in alignment with each other transversely and substantially centrally of the housing A and perpendicular to the shaft B. The housing A is divided by a partition wall A' into two compartments, in the left one of which as shown in Figure 1 is arranged the differential gearing D for connecting and driving the shafts C and C'. This differential gearing may be of any suitable constuction but as shown comprises the bevel gear wheels E and E' respectively having a splined engagement with the inner ends of the shafts C and C' and the intermediate bevel gear wheels $E^2$ mounted on the shaft $E^3$. The shaft $E^3$ extends diametrically across the differential housing $E^4$ thereby compelling the gear wheels $E^2$ to rotate therewith and to function in the usual way.

Sleeved upon and independently rotatable and slidable on the shaft C' is a tubular shaft F. The outer end of the shaft F is provided with a gear or tooth clutch member G which is adapted for alternative engagement with the internal tooth clutch members G' and $G^2$, respectively upon the hubs H and I of bevel ring gears H' and I'. The hub H surrounds the tubular shaft F and is spaced therefrom by a bushing J. This bushing is in turn supported by a roller bearing K upon a portion $A^2$ of the housing A. The hub I is journaled in a roller bearing L mounted in a removable head L' in the end wall of the casing A which head also forms a journal $L^2$ for the shaft C'. The bearing L is adapted to take care of both radial and end thrust, as is also the case with the bearing K. Intermediate the ring gears H' and I' is an end thrust ball bearing $L^3$, the arrangement being such that all of these members C', G, H and I are held concentrically with each other and are individually supported to take care of the stresses to which they are subjected.

The ring gears H' and I' are arranged one within the other so as to respectively intermesh with the bevel pinions M and M'. These pinions are both fixed upon the drive shaft B and consequently both ring gears form in connection therewith constant mesh gear trains which are running whenever the shaft B is driven. However, these ring gears are only used alternatively to communicate motion to the shafts C and C', depending upon the engagement of the clutch member G therewith and connecting mechanism now to be described.

The differential gear housing $E^4$ has a hub $E^5$ which extends over the shaft C' and tubular shaft F. This hub has an internal clutch member $E^6$ which is adapted for engagement with an extrenal clutch member N which is slidable upon and splined to the tubular shaft F. Surrounding the hub $E^5$ is the hub O of a spur gear O' and which is journaled in the roller bearing $O^2$ in the partition wall A'. The hub O has an inwardly extending flange $O^3$ which forms an internal clutch member in alignment with the internal clutch member $E^6$ and engaging with the external clutch member N in all positions of the latter. Thus by shifting the clutch member N longitudinally upon the tubular shaft F the latter may be coupled or uncoupled with the differential gear housing $E^4$.

Arranged within the compartment of the housing which contains the differential gearing is a counter shaft P, preferably a tubular shaft sleeved upon a stationary shaft P' which is mounted in the outer and intermediate wall A' of the housing A. Upon this counter shaft is a spur gear wheel $P^2$ which is in constant mesh with the spur gear wheel O'. The counter shaft P is also provided with a splined portion upon which is mounted the slidable gear Q which in one position of adjustment is intermeshed with a spur gear Q' fixed upon the differential gearing housing $E^4$. The gear Q is also adapted to engage an idler gear R which is sleeved upon a stationary shaft R' and which carries a gear wheel $R^2$ in constant mesh with the gear wheel Q'. Thus by shifting the gear Q into engagement with the gear wheel Q' there is established direct driving engagement between the counter shaft and the differential gearing housing while the shifting of the gear Q into engagement with the gear R will establish a reverse drive connection between the counter shaft and the differential gearing housing.

*Operation*

With the construction as described the operation to obtain the various driving speeds, forward and reverse is as follows: As has been stated, the bevel gear wheels M and M' being in constant mesh with the ring gears H' and I', the latter will be continuously running whenever the shaft B is driven. If the highest speed operation is desired, the ring gear H' is clutched to the tubular shaft F by the sliding movement thereof upon the shaft C'. The clutch member N is also moved upon the tubular shaft F so as to engage the internal clutch member $E^6$ thereby directly coupling the differential gearing housing $E^4$ with the shaft F and through the latter with the ring gear H', all of these parts rotating at the same speed. To establish second speed the clutch member N is permitted to remain in engagement with the clutch member $E^6$ but the clutch member G is shifted from its engagement with the clutch member G' to an engagement with the clutch member $G^2$. This couples the larger ring gear I' with the tubular shaft F and differential gearing housing $E^4$ causing all of these parts to rotate at the same speed but one which is less than the speed of rotation of the ring gear H'.

To drive the differential gearing housing $E^4$ at still lower speeds the clutch member N is shifted out of engagement with the clutch member $E^6$. By reason of the engagement of the latter with the clutch member $O^3$, the tubular shaft F is coupled with the gear wheel O' which is in constant mesh with the gear wheel $P^2$ on the counter shaft. If the gear wheel Q on said counter shaft is now shifted into engagement with the gear wheel Q', the differential gearing housing will be driven in a forward direction at reduced speed, or if, on the other hand, the gear wheel Q is shifted into mesh with the gear wheel R the differential gearing housing will be driven in the reverse direction. It is also obvious that each of these forward and reverse drive connections can be operated either through the medium of the high speed ring gear H' or the low speed ring gear I', so that it is possible to obtain any one of these different speeds in either forward or reverse. However, for practical purposes it may not be necessary to use more than a single reverse speed, but it is highly desirable that any one of the speeds forward or reverse may be thrown in by the manipulation of a single control lever. This necessitates a control mechanism which effects a cooperative adjustment of the various clutch members and which preferably is constructed as follows:

*Control mechanism*

In the upper portion of the housing A and preferably mounted in the cover $A^2$ thereof is a control shaft S slidable longitudinally and also rockable. This shaft has connected thereto an upright actuating arm S' by means of which it is manipulated. Mounted upon and depending from the shaft S is an arm or finger $S^2$ which passes through a plurality of apertured plates T and T' slidably supported in guideways U to be movable parallel to the axis of the shaft S. As shown, these guideways are formed by a top plate U', a bottom plate $U^2$ and a series of spacers $U^3$ and $U^4$ which are clamped together by bolts or rivets $U^5$.

Beneath the guides U are the transversely extending shifter rods V, V', $V^2$ which are slidably mounted in bearings $V^3$ in the outer end partition walls of the casing A. The shifter V is connected by a fork W with a grooved collar $Q^2$ on the hub of the gear wheel Q. The shifter V' has connected thereto the fork W' which engages a grooved collar F' on the sleeve F and the shifter $V^2$ has a fork $W^2$ which engages the grooved collar N' in the clutch member N. The shifter $V^2$ has connected to its opposite end an angle member X which extends beneath the guide U and is slotted parallel to the axis of the shaft S to receive the lower end of the finger $S^2$. This slot permits the free longitudinal movement of the rod S without effecting the shifter $V^2$ but the rocking movement of said shaft S will cause the finger $S^2$ to slide the shifter $V^2$ in its bearings and to correspondingly adjust the clutch member N.

The shifters V and V' are each provided with upwardly extending pins Y and Y' which extend into engagement with slots $U^6$ and $U^7$ respectively in the lower plate $U^2$ of the guide and also the slots $T^2$ and $T^3$ respectively in the slides T and T'. These slots are so fashioned that during the sliding movement respectively of the slides T and T' the pins Y and Y' will be shifted in a transverse direction which is that of the axes of the shifters V and V' so as to communicate motion to these shifters.

Without describing in further detail, it will be understood that movements are imparted to the shifters V and V' by the longitudinal movement of the shaft S, while a rocking movement of said shaft imparts movement to the shifter V². This movement of the shifter V² by the rocking of the shaft S is also employed for preventing movement of the slide T' when the slide T is alone actuated. For this purpose the member X is provided with an upwardly extending ear X' which when the finger S² is rocked in one direction will be engaged in a notch T⁴ in the plate T', holding said plate from sliding movement.

Operation

With the position of parts as indicated in Figure 4 the control arm is in neutral which unclutches the ring gears H' I' permitting them to run idle and also places the countershaft gear Q in neutral position. When the control arm is rocked to the left the finger S² will be rocked to the right which actuates the shifter V² and connecting parts, the sleeve N remaining coupled with the gear O' intermeshing with the countershaft gear P². If the control arm is then drawn rearward it will actuate both of the plates T and T' in a rearward direction so that the cam slots T² and T³ in cooperation with the slots U⁶ and U⁷ and a stationary plate U² will cause the pins Y and Y' to adjust the shifters V and V'. This will move the countershaft gear Q into mesh with the reverse gear and engages the clutch member G on the sleeve F with the clutch member G² on the large bevel gear wheel I', thereby completing a low speed reverse drive. When the shifter arm is moved forward from this position the plates T and T' will be correspondingly moved and by actuating the shifters V and V' will engage the countershaft gear Q with the gear Q' on the differential gearing housing and will move the clutch member G out of engagement with the clutch member G² and into engagement with the clutch member G'. This couples in the high speed bevel gear wheel H' and establishes a normal low speed forward drive. A still lower forward drive is established by moving the control lever farther in the same direction which through the cam slot T³ changes the clutch member G from its engagement with the member G' into engagement with the member G², thereby coupling in the low speed bevel gear I'.

The higher or driving speeds are obtained by returning the control arm to neutral position and rocking it to the right which rocks the finger S² to the left. This engages the clutch member N with the clutch member E⁶ or in other words, directly couples the sleeve F with the differential gearing housing. This same movement engages the ear X' with the notch T⁴ in the plate T', locking this plate from any sliding movement and holding it in a position where the countershaft gear Q is in neutral position and out of mesh with either the gear wheel Q' or the reverse gear R. If the control arm is then moved rearward the cam slot T³ in the plate T will actuate the shifter V' to move the clutch member G into engagement with the clutch member G² coupling in the low speed bevel gear I'. Finally, if the control arm is moved forward it will change the clutch member G into engagement with the clutch member G' coupling in the high speed bevel gear. Further forward movement of the control arm is prevented by reason of the locked plate T' which acts as a limiting stop.

It will be noted that with the control mechanism above described the lateral rocking movement of the control arm will in itself effect a change in clutch engagement. Thus I utilize a movement which in a standard gear shift is without function for effecting a useful adjustment in the changing of gears.

The concentric relation of the bevel gear wheels H' and I', their supporting hubs, the driven shaft C' and the clutch sleeve F, makes an exceedingly compact arrangement of mechanism rotatively supported in the roller bearings K and L. As these roller bearings have conical raceways they also form opposite end thrust bearings for the gear wheels H' and I' while the ball bearing L³ intermediate the two gear wheels transmits the thrust of one to the other in a frictionless manner. Thus a single adjustment will take up lost motion in all of these bearings.

The arrangement of the differential gearing on one side of the central longitudinal axis of the transmission and the parallel arrangement of the countershaft and reverse gear within the same transverse limits still further condenses the mechanism, as well as obtaining symmetrical arrangement on opposite sides of the drive shaft axis. Thus the whole arrangement is one which is particularly adapted for use in a front wheel drive mechanism, as above stated.

What I claim as my invention is:

1. A transmission gearing comprising a housing, a drive shaft extending centrally thereinto, aligned driven shafts extending transversely of said housing, a differential gearing connecting said driven shafts located within said housing at one side of the axis of said drive shaft, a countershaft parallel with said driven shafts, a constant mesh gear train having one member thereof on said countershaft and another concentric with said driven shaft, a drive gear surrounding said differential gearing, a reverse pinion in constant mesh with said last mentioned gear, a shiftable gear on said counter shaft for alternatively coupling the same directly with the drive gear for said differential gearing, and indirectly through the medium of said reverse gear, a constant mesh bevel gear train between said drive shaft and said driven shaft located on the opposite side of the axis of said drive shaft and means for alternatively coupling the driven member of said last mentioned constant mesh drive train directly with said differential gearing and indirectly through the medium of said first mentioned constant gear train.

2. A transmission gearing comprising a housing, a drive shaft extending centrally and longitudinally thereinto, aligned driven shafts extending transversely of said housing, a differential gearing connecting said driven shafts located within said housing at one side of the axis of said drive shaft, a countershaft, a reverse gearing and cooperating elements of gear trains located substantially within the transverse limits of said differential gearing, a plurality of constant mesh bevel gear trains between said drive shafts and driven shafts located on the opposite sides of the axis of said drive shaft and enveloping one another within substantially the same transverse limits, and coupling means between said constant mesh bevel gear trains, said differential gearing and cooperating gears for establishing a plurality of differential speed trains between said drive and driven shafts in forward and reverse direction, said coupling means being located within the transverse space limits of said differential gearing and constant mesh gear trains.

3. A transmission gearing comprising a housing, a drive shaft extending centrally and longitudinally thereinto, aligned driven shafts extending transversely of said housing, a differential gearing connecting said drive shafts located within said housing at one side of the axis of said drive shaft, a plurality of constant mesh differential bevel gear trains between said drive shaft and driven shaft located on the opposite side of the axis of said drive shaft, said trains enveloping one another, a partition in said housing between said constant mesh trains and differential gearing dividing said housing into two compartments, a countershaft and a reverse gear within the compartment for said differential gearing, a constant mesh gear train also within said compartment having one member thereof concentric with said countershaft and the other concentric with said driven shaft, a drive gear for said differential gearing in constant mesh with said reverse gear, a shiftable gear on said countershaft for alternatively coupling with said reverse gear and directly with said differential gearing drive gear, a sleeve extending between the compartments concentric with said driven shaft having an alternatively coupling engagement with the driven members of said constant mesh bevel gear trains and coupling means for alternatively connecting said sleeve directly with said differential gearing and indirectly through the medium of the constant mesh gear train in the same compartment.

4. A transmission gearing comprising a housing, a drive shaft extending centrally and longitudinally thereinto, aligned driven shafts extending transversely of said housing, a differetial gearing connecting said driven shafts located within said housing in one side of the axis of said drive shaft, a plurality of constant mesh bevel gear trains between said drive shaft and said driven shaft located on the opposite sides of the axis of said drive shaft and enveloping one another, a countershaft, a reverse gear arranged parallel to said differential gearing and substantially within the same transverse space limits, gears cooperating with said countershaft and reverse gear for establishing a plurality of forward and reverse trains and means concentric with said driven shaft for alternatively coupling said trains with the drive gears of said constant mesh bevel gear train.

5. A transmission comprising a casing, a driving shaft therein having a pair of bevel driving pinions, aligned driven shafts extending transversely to said driving shaft, a pair of bevel gears meshing with the respective pinions aforesaid and located on one side of the axis of said drive shaft, bearings for said bevel gears supported from said casing, a differential gearing unit connecting said driven shafts and arranged on the opposite side of the axis of said driving shaft, said differential gearing unit being closely spaced from the axis of said driving shaft to provide transverse compactness, selective gearing comprising a transversely shiftable member within the transverse limits of said differential gearing unit and said bevel gear bearings for providing three or more forward ratios and a reverse speed ratio, a control member movable in parallel paths to effect the shifting of said transversely shiftable member, said control member being movable transversely from one path into the other whereby said transversely shiftable member may be connected in predetermined speed ratios by a longitudinal movement of said control member.

6. A driving mechanism comprising a longitudinally extending driving shaft, a pair of transversely extending driven shafts, a differential connecting said driven shafts and located at one side of the axis of said driving shaft, a drive sleeve surrounding one of said driven shafts and operatively connected to said driving shaft, a countershaft parallel to said driven shafts and adjacent said differential, a gear train between said differential and said driving shaft connecting said countershaft and said drive sleeve, said differential being spaced from said driving shaft by a distance sufficient only for said single gear train, and gearing between the outer end of said differential and said gear train for connecting said countershaft and said differential.

7. A driving mechanism comprising a longitudinally extending driving shaft, a pair of transversely extending driven shafts, a differential connecting said driven shafts and located at one side of the axis of said driving shaft, a drive sleeve surrounding one of said driven shafts and operatively connected to said driving shaft, a countershaft parallel to said driven shafts and adjacent said differential, a gear train between said differential and said driving shaft connecting said countershaft and said drive sleeve, said differential being spaced from said driving shaft by a distance sufficient only for said single gear train, and a pair of gear trains between the outer end of said differential and said gear train for alternatively connecting said differential to said countershaft.

8. A driving mechanism comprising a longitudinally extending driving shaft, a pair of transversely extending driven shafts, a drive sleeve surrounding one of said driven shafts, means on one side of said driving shaft for connecting the same with said drive sleeve, a two speed transmission on the opposite side of said driving shaft connected to said drive sleeve, and a differential gear unit connected to said driven shafts and said transmission, said differential gear unit lying at least in part within the transverse limits defined by the outer end of said transmission and said driving shaft.

9. A driving mechanism comprising a longitudinally extending driving shaft, a pair of transversely extending driven shafts, a differential connecting said driven shafts and located at one side of the axis of said driving shaft, a drive sleeve surrounding one of said driven shafts and operatively connected to said driving shaft, a countershaft parallel to said driven shafts and adjacent said differential, a gear train connecting said countershaft and said drive sleeve and located between said differential and said driving shaft, a pinion on said countershaft between the ends of said differential and a gear connecting said pinion with said differential.

10. A driving mechanism comprising aligned driven shafts, a differential gearing unit connecting said shafts, a countershaft parallel to said driven shafts, a gear concentric with one of said driven shafts, a cooperating gear on said countershaft and gearing on the opposite side of said differential unit from said concentric gear connecting said countershaft and said differential unit and arranged within the space between the ends of said differential unit.

11. A driving mechanism comprising a driving shaft, transversely extending aligned driven shafts, a countershaft parallel to said driven shafts on one side of said driving shaft, a drive sleeve surrounding one of said driven shafts and connected to said driving shaft, a pair of countershaft gear trains, one of said gear trains being connected to said drive sleeve, and a differential gear unit between said driven shafts, said gear unit being connected to one of said countershaft gear trains and being disposed between said train and the other countershaft gear train.

12. A driving mechanism comprising a longitudinally extending driving shaft, a pair of transversely extending driven shafts, a differential connecting said driven shafts and located at one side of the axis of said driving shaft, a drive sleeve surrounding one of said driven shafts and operatively connected to said driving shaft, a countershaft parallel to said driven shafts and adjacent said differential, a gear train located between said differential and said driving shaft connecting said countershaft and said drive sleeve, a gear on said differential at the end thereof furthest from said gear train and within the transverse limits of said differential, a countershaft pinion adapted to mesh with said gear.

13. A driving mechanism comprising aligned driven shafts, a differential gearing unit connecting said shafts, a countershaft parallel to said driven shafts, a gear concentric with one of said driven shafts, a cooperating gear on said countershaft, and gearing connecting said countershaft and said differential unit and arranged within the space between the ends of said differential unit.

14. In a driving mechanism for motor vehicles, the combination with a pair of aligned transversely extending driven shafts, of differential gearing connecting said shafts, a longitudinally extending drive shaft, and means for operatively connecting said driving shaft and said differential gearing, said means including selective gearing comprising a transversely extending countershaft and a member slidable on said countershaft within the transverse limits of said differential gearing to effect selection of said selective gearing.

15. In a driving mechanism for motor vehicles, the combination with a pair of aligned transversely extending driven shafts, of differential gearing connecting said shafts, a longitudinally extending drive shaft, and means for operatively connecting said driving shaft and said differential gearing, said means including selective gearing comprising a transversely extending countershaft, a gear slidable on said countershaft within the transverse limits of said differential gearing, means operatively connecting said gear with said driving shaft, and gears connected with said differential gearing and supported for rotation about fixed axes for selective engagement with said slidable gear.

16. In a driving mechanism for motor vehicles, the combination with a pair of aligned transversely extending driven shafts, of differential gearing connecting said shafts, a longitudinally extending drive shaft, and means for operatively connecting said driving shaft and said differential gearing, said means including selective forward and reverse gearing, the major portion of said gearing being disposed opposite to and within the transverse limits of said differential gearing.

17. A transmission comprising a casing, a driving shaft therein having a pair of bevel driving pinions, aligned driven shafts extending transversely to said driving shaft, a pair of bevel gears meshing with the respective pinions aforesaid and located on one side of the axis of said drive shaft, a differential gearing unit connecting said driven shafts and arranged on the opposite side of the axis of said driving shaft, said differential gearing unit being closely spaced from the axis of said driving shaft to provide transverse compactness, and gearing for coupling said driving and driven shafts in three or more forward ratios and a reverse speed ratio and including selectively shiftable elements, at least a portion of said last named gearing including one of said elements lying within the transverse limits of said differential gearing unit.

CORNELIUS W. VAN RANST.